US012244392B2

(12) United States Patent
Cho (10) Patent No.: US 12,244,392 B2
(45) Date of Patent: Mar. 4, 2025

(54) HUB FOR SUPPORTING VOICE RELAY BETWEEN WEARABLE TERMINALS IN VEHICLE AND METHOD OF SUPPORTING VOICE RELAY BY USING SAME

(71) Applicants: Hyundai Motor Company, Seoul (KR); Kia Corporation, Seoul (KR)

(72) Inventor: Yong Sik Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 401 days.

(21) Appl. No.: 17/752,155

(22) Filed: May 24, 2022

(65) Prior Publication Data

US 2023/0078900 A1    Mar. 16, 2023

(30) Foreign Application Priority Data

Sep. 14, 2021  (KR) .......................... 10-2021-0122670

(51) Int. Cl.
*H04W 88/04*     (2009.01)
*H04B 7/14*      (2006.01)
*H04B 7/155*     (2006.01)
*H04W 76/15*     (2018.01)

(52) U.S. Cl.
CPC ............ *H04B 7/155* (2013.01); *H04W 76/15* (2018.02)

(58) Field of Classification Search
CPC ...... H04B 7/155; H04B 7/15507; H04B 7/14; H04B 1/3822; H04W 76/14; H04W 76/15; H04W 84/18; H04W 88/04; H04W 4/80

USPC ........................................................... 455/15
See application file for complete search history.

(56) References Cited

U.S. PATENT DOCUMENTS

| | | | |
|---|---|---|---|
| 10,701,617 B2 * | 6/2020 | Choi | H04W 74/0833 |
| 2009/0204410 A1 * | 8/2009 | Mozer | G10L 15/30 |
| | | | 704/E15.001 |
| 2011/0159802 A1 * | 6/2011 | Binti Harum | H04B 7/15528 |
| | | | 455/7 |
| 2012/0276912 A1 * | 11/2012 | Zhang | H04W 76/10 |
| | | | 455/450 |
| 2019/0159018 A1 * | 5/2019 | Basu Mallick | H04W 8/005 |
| 2019/0377521 A1 * | 12/2019 | Tokuchi | G10L 15/22 |
| 2020/0014606 A1 * | 1/2020 | Tokuchi | H04L 41/50 |
| 2020/0047641 A1 * | 2/2020 | D'Eramo | B64D 11/0601 |
| 2020/0162914 A1 * | 5/2020 | Chun | H04W 12/062 |
| 2021/0125411 A1 * | 4/2021 | Choi | G06F 3/011 |

(Continued)

FOREIGN PATENT DOCUMENTS

KR    2008-0088692 A    10/2008

*Primary Examiner* — Andrew Wendell
(74) *Attorney, Agent, or Firm* — Fox Rothschild LLP (57) ABSTRACT

A hub for supporting a voice relay between wearable terminals in a vehicle includes a reception processing device that receives a voice signal from at least one transmission terminal among two or more wearable terminals in the vehicle, a transmission processing device that transmits the voice signal to at least one reception terminal among the wearable terminals, and a controller that establishes a communication channel with each of the wearable terminals, selects a target terminal based on a voice signal obtained from a conversation attempt terminal attempting to transmit voice, and controls the reception processing device and the transmission processing device to relay bidirectional voice information transfer between the conversation attempt terminal and the target terminal.

18 Claims, 11 Drawing Sheets

(56) References Cited

U.S. PATENT DOCUMENTS

| | | | | |
|---|---|---|---|---|
| 2021/0355738 A1* | 11/2021 | Jang | ............... | B60R 21/015 |
| 2021/0403018 A1* | 12/2021 | Kim | ............... | B60W 60/0051 |
| 2022/0327931 A1* | 10/2022 | Tsubakimoto | ............... | G08G 1/005 |
| 2023/0071159 A1* | 3/2023 | Drozhilkin | ............... | H04M 3/42042 |
| 2023/0339369 A1* | 10/2023 | Diamond | ............... | B60N 2/002 |
| 2024/0056951 A1* | 2/2024 | Back | ............... | H04W 40/22 |
| 2024/0276273 A1* | 8/2024 | Chang | ............... | H04W 24/10 |
| 2024/0283847 A1* | 8/2024 | Binder | ............... | H04L 67/12 |

* cited by examiner

Fig.11

HUB FOR SUPPORTING VOICE RELAY BETWEEN WEARABLE TERMINALS IN VEHICLE AND METHOD OF SUPPORTING VOICE RELAY BY USING SAME

CROSS-REFERENCE TO RELATED APPLICATION

This application claims under 35 U.S.C. § 119(a) the benefit of Korean Patent Application No. 10-2021-0122670, filed in the Korean Intellectual Property Office on Sep. 14, 2021, the entire contents of which are incorporated herein by reference.

BACKGROUND

(a) Technical Field

The present disclosure relates to a hub for supporting a voice relay between wearable terminals in a vehicle and a method of supporting the voice relay by using the same.

(b) Description of the Related Art

Because the occupants in a vehicle sit facing the same direction, it is not easy to have a conversation between people sitting in different rows. In particular, it is more difficult to have an in-vehicle conversation in a van or a vehicle having more seats.

Accordingly, there is a need to seek a method of more flexibly supporting a conversation between passengers in a vehicle while minimizing possible modifications to the vehicle.

SUMMARY

An aspect of the present disclosure provides a hub for supporting a voice relay between wearable terminals in a vehicle, which is capable of relaying conversations between occupants within the vehicle while minimizing additional hardware configuration, and a method of supporting a voice relay by using the same.

Another aspect of the present disclosure provides a hub for supporting a voice relay between wearable terminals in a vehicle, which is capable of relaying conversation while protecting the privacy of users by making it impossible to listen to the conversation except for selected users, and a method of supporting a voice relay by using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hub for supporting a voice relay between wearable terminals in a vehicle includes a reception processing device that receives a voice signal from at least one transmission terminal among two or more wearable terminals in the vehicle, a transmission processing device that transmits the voice signal to at least one reception terminal among the wearable terminals, and a controller that establishes a communication channel with each of the wearable terminals, selects a target terminal based on a voice signal obtained from a conversation attempt terminal attempting to transmit voice, and controls the reception processing device and the transmission processing device to relay bidirectional voice information transfer between the conversation attempt terminal and the target terminal.

According to an embodiment, the controller may select the target terminal by one-to-one matching between the wearable terminals and a seat number that distinguishes a seat of the vehicle, and extracting the seat number from the voice signal.

According to an embodiment, the controller may control signal output devices such that signal output devices matching seat numbers on a one-to-one basis output different identification signals, receive information on a highest sensitivity identification signal received at a highest sensitivity among a plurality of identification signals from a first wearable terminal among the wearable terminals, and match the first wearable terminal with the seat number that matches a highest sensitivity signal output device configured to output the highest sensitivity identification signal among the signal output devices.

According to an embodiment, the controller may use directional speakers respectively arranged in the seats as the signal output device.

According to an embodiment, the controller may set at least one of a frequency, a period, an amplitude, or an output timing of each of the identification signals differently.

According to an embodiment, the controller may provide information on seat numbers where users of the wearable terminals are seated to portable terminals of the users.

According to an embodiment, the controller may control the transmission processing device to transmit a multimedia voice to a reception restrict terminal matching a seat number not included in the voice signal.

According to an embodiment, the controller may control the transmission processing device to stop transmitting the multimedia voice based on confirmation of a state in which an access restrict user does not wear the reception restrict terminal.

According to an embodiment, the controller may transmit the multimedia voice through a speaker closest to an access restrict user among speakers in the vehicle, based on confirmation of a state in which the access restrict user does not wear the reception restrict terminal.

According to an embodiment, the controller may control the transmission processing device to stop transmitting the multimedia voice based on a sleeping state of a user wearing the reception restrict terminal.

According to an embodiment, the controller may identify hearing ability information of users of the wearable terminals by searching for information stored in advance, and adjust a volume of a voice signal transmitted through the wearable terminals based on the hearing ability.

According to an embodiment, the controller may output the voice signal through a speaker inside the vehicle closest to the target terminal based on confirmation of a state in which a user does not wear the target terminal.

According to another aspect of the present disclosure, a method of supporting a voice relay between at least two wearable terminals in a vehicle by using a hub includes forming a communication channel with each of the wearable terminals, obtaining a voice signal from a conversation attempt terminal attempting to transmit voice among the wearable terminals, selecting at least one target terminal from the wearable terminals based on the voice signal, and relaying voice information transfer between the conversation attempt terminal and the target terminal.

According to an embodiment, the forming of the conversation channel may include obtaining seat numbers of seats in which the wearable terminals are located.

According to an embodiment, the obtaining of the seat numbers may include controlling signal output devices to allow the signal output devices matching the seat numbers on a one-to-one basis to output identification signals having different frequencies, receiving information on a highest sensitivity identification signal received at a highest sensitivity among the identification signals from a first wearable terminal among the wearable terminals, identifying a location of a highest sensitivity signal output device that outputs the highest sensitivity identification signal among the signal output devices, and designating a seat number matching the highest sensitivity signal output device among the seat numbers as a seat number of the first wearable terminal.

According to an embodiment, the selecting of the target terminal may include extracting a mode selection command from the voice signal, and extracting a seat number of the target terminal from the voice signal based on the extracted mode selection command being a dialogue support mode for voice relay.

According to an embodiment, the selecting of the target terminal may further include identifying a reception restrict terminal that is not selected from the wearable terminals as the target terminal. In this case, the method may further include transmitting, by the hub, a multimedia voice to the reception restrict terminal based on identification of the reception restrict terminal.

According to an embodiment, the method may further include suspending the multimedia voice from being transmitted based on a result of determining that the user does not wear the reception restrict terminal.

According to an embodiment, the identifying of the reception restrict terminal may further include determining whether a user wearing the reception restrict terminal is in a sleeping state, and suspending the multimedia voice from being transmitted based on a result of determining that the user is in the sleeping state.

According to an embodiment, the forming of the communication channel may further include checking hearing information of users of the wearable terminals by searching for information stored in advance. The relaying of the voice information transfer may include adjusting a volume of a voice transmitted to the users through the wearable terminals based on the hearing information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 11.

Figure 1:
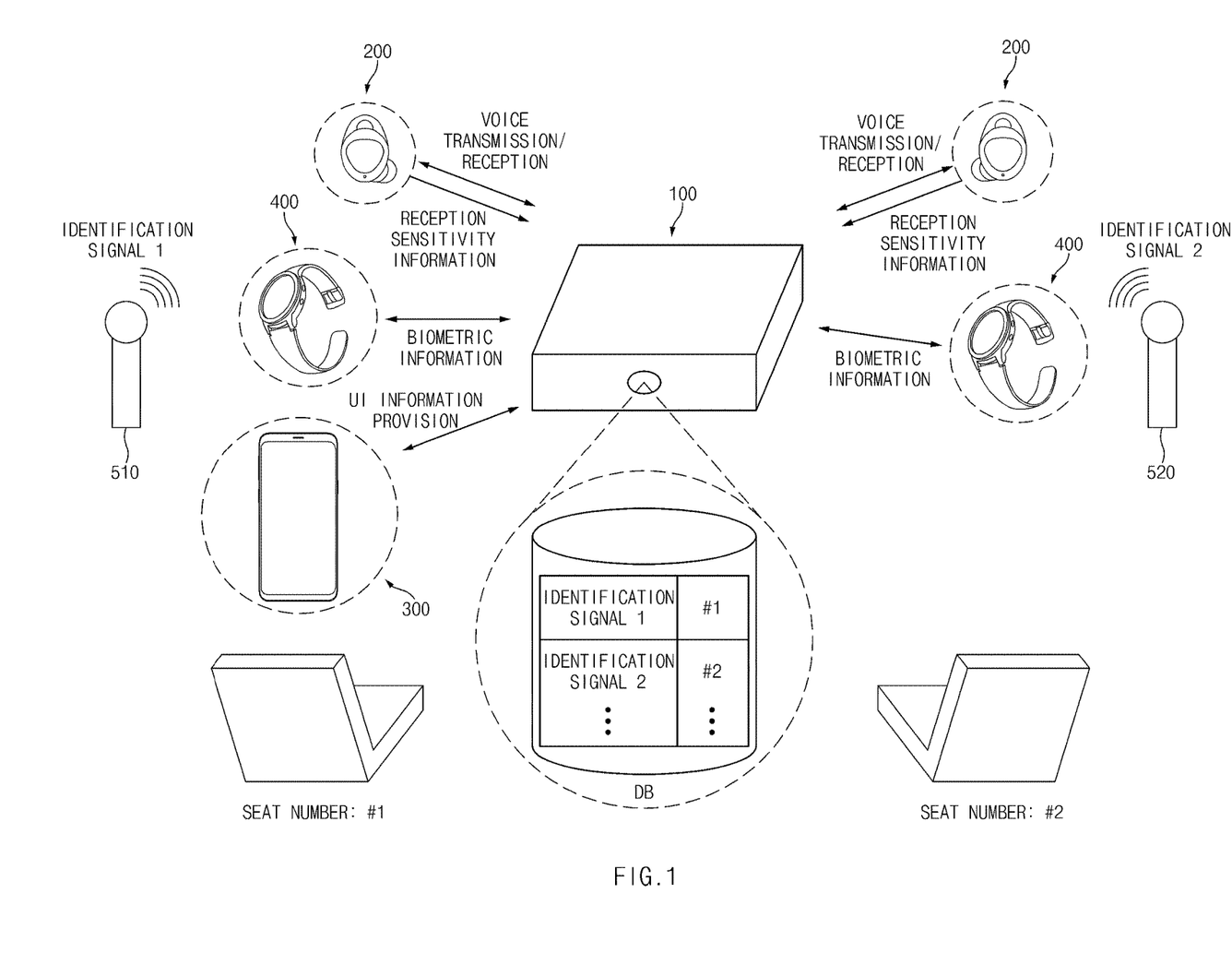
FIG. 1 is a schematic diagram illustrating a conversation relay system according to an embodiment of the present disclosure.
Figure 2:
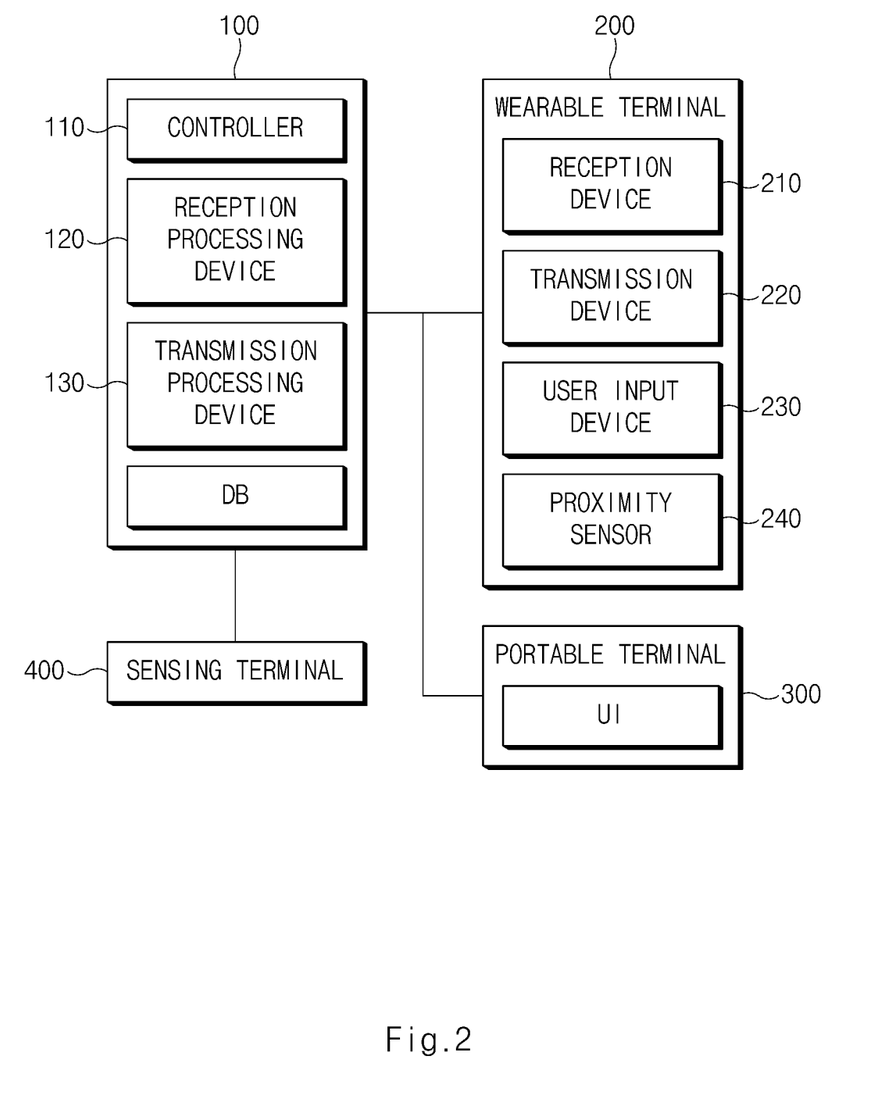
FIG. 2 is a block diagram illustrating the configuration of a conversation relay system.

FIG. 1 is a schematic diagram illustrating a conversation relay system according to an embodiment of the present disclosure. FIG. 2 is a block diagram illustrating the configuration of the conversation relay system shown in FIG. 1.

Referring to FIGS. 1 and 2, an in-vehicle conversation relay system according to an embodiment of the present disclosure may include a hub 100, a wearable terminal 200, a portable terminal 300, and a sensing terminal 400.

The hub 100 according to an embodiment of the present disclosure may be implemented inside a vehicle. The hub 100, which is provided to relay a conversation between two or more wearable terminals 200 in a vehicle, may include a controller 110, a reception processing device 120, and a transmission processing device 130.

The controller 110 may form a communication channel with each wearable terminal. The communication channel refers to a voice information transmission/reception path between each wearable terminal 200 and the hub 100. The controller 110 may select a target terminal based on a voice signal obtained from a conversation attempt terminal attempting to transmit a voice. The conversation attempt terminal refers to the wearable terminal 200 worn by a user who attempts a voice conversation with another user in the vehicle. The target terminal refers to the wearable terminal 200 worn by a user who receives a request for a voice conversation through the conversation attempt terminal. The controller 110 controls the reception processing device 120 and the transmission processing device 130 to relay voice information transfer between the conversation attempt terminal and the target terminal. Voice information relay through the hub 100 may support bidirectional communication.

The controller 110 obtains seat information in the vehicle from the voice signal from the conversation attempt terminal, and calls the wearable terminal 200 matching the seat information as the target terminal. To this end, the controller 110 may match the seat numbers to each wearable terminal 200, and store the seat numbers #1 and #2 and the wearable terminals 200 in the database DB while matching them to each other. The seat number refers to seat information that identifies the seat on which the user of the wearable terminals 200 sits. The wearable terminals 200 may receive an identification signal from a signal output device that transmits different identification signals, and may obtain the seat number of the seat in which the corresponding wearable terminal 200 is located based on the reception sensitivity of the identification signal. A scheme by which the wearable terminals 200 obtain a seat number will be described later.

In the present specification, the voice signal is not limited to only a physical sound wave, but includes text information obtained by converting a sound wave received based on voice recognition. The voice recognition function may be performed based on artificial intelligence, and to this end, the controller 110 may include an artificial intelligence (hereinafter, referred to as AI) processor. The AI processor may learn a neural network by using a pre-stored program. A neural network for voice recognition may be designed to simulate a human brain structure on a computer, and may include a plurality of network nodes having weights that simulate neurons of a human neural network. A plurality of network nodes may transmit and receive data according to each connection relationship, such that a neuron simulates a synaptic activity of a neuron that transmits and receives a signal through a synapse. The neural network may include a deep learning model developed from a neural network model. In a deep learning model, a plurality of network nodes may exchange data according to a convolutional connection relationship while being located in different layers. For example, the neural network model may include various deep learning schemes such as deep neural networks (DNN), convolutional deep neural networks (CNN), recurrent Boltzmann machine (RNN), restricted Boltzmann machine (RBM), deep belief networks (DBN), and deep Q-network.

The reception processing device 120 receives a voice signal from the transmission terminal, and the transmission processing device 130 transmits a voice signal to the reception terminal. Because voice relay through the hub 100 is bidirectional, the conversation attempt terminal and the target terminals may correspond to the transmission terminal and the reception terminal, respectively.

The wearable terminal 200, which is worn by a user to transmit and receive voice signals, may include a reception device 210, a transmission device 220, a user input device 230, and a proximity sensor 240.

The reception device 210 may receive a voice signal from the hub 100, and the transmission device 220 may transmit a voice signal to the hub 100. The user input device 230 is configured to receive an input for controlling the wearable terminal 200. The user input device 230 may be implemented as a keypad, a dome switch, a touch pad, a jog wheel, a jog switch, or the like.

The proximity sensor 240, which is provided to determine whether the wearable terminal 200 is worn by the user, may generate a signal for determining whether the wearable terminal 200 is worn based on the separation distance between the wearable terminal 200 and the user.

In an embodiment of the present disclosure, the reception processing device 120 and the transmission processing device 130 of the hub 100, and the reception device 210 and the transmission device 220 of the wearable terminal 200 may use one or more of various wireless communication standards. For example, in an embodiment of the present disclosure, the wireless transmission/reception devices may transmit/receive data by using a wireless communication standard such as a wireless HD (WiHD), a wireless home digital interface (WHDI), a wireless data transmission system (Wireless Fidelity: WiFi), or the like. Alternatively, data may be wirelessly transmitted/received by using short-range communication standards such as Bluetooth, ZigBee, binary code division multiple access (CDMA), or the like.

The portable terminal 300 may be a mobile communication terminal, a tablet, a smart phone, or the like, and may be implemented in the form of a smart watch to be integrated with the sensing terminal 400. The sensing terminal 400 may be in contact with the user's body to obtain the user's biometric information, and may be, for example, in the form of a watch.

Figure 3:
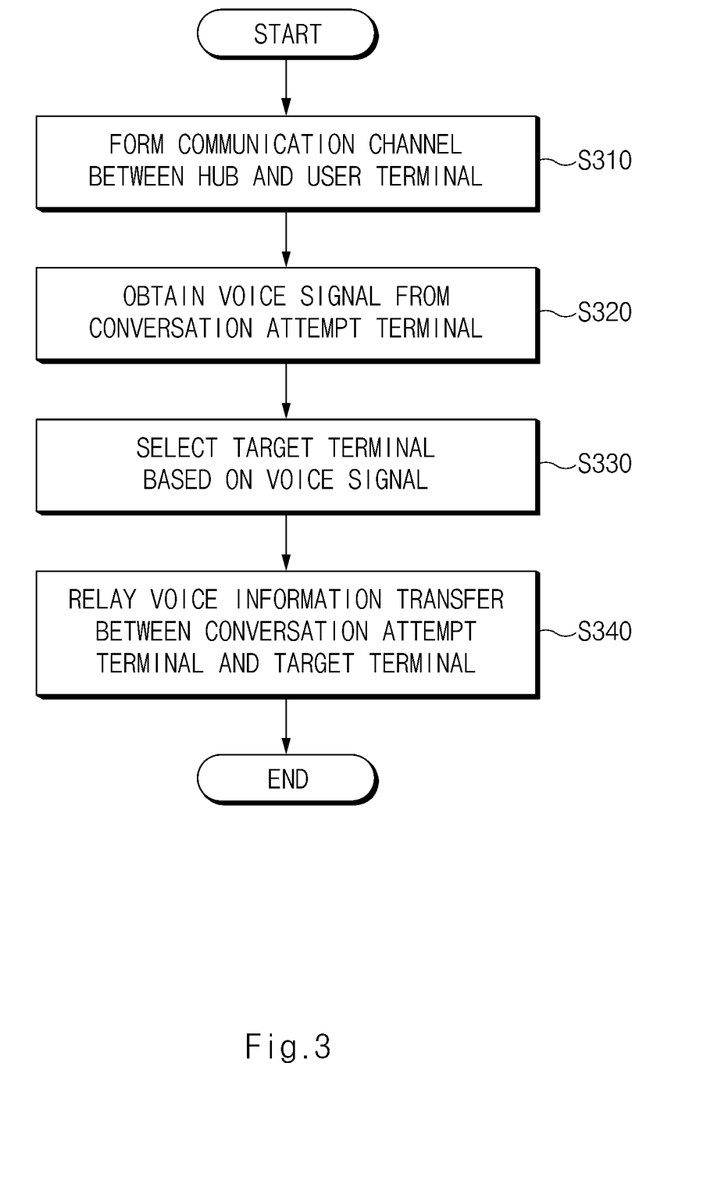
FIG. 3 is a flowchart illustrating a wireless relay method according to an embodiment of the present disclosure.

FIG. 3 is a flowchart illustrating a wireless relay method according to an embodiment of the present disclosure. Hereinafter, in the present specification, a procedure of performing an in-vehicle voice relay based on the procedure illustrated in FIG. 3 will be referred to as a conversation support mode.

Referring to FIG. 3, a method of relaying a voice signal between two or more wearable terminals in a vehicle according to an embodiment of the present disclosure includes a first operation S310 of allowing the hub 100 to form a communication channel with each wearable terminal 200. The hub 100 may form the communication channel with each of the wearable terminals 200 based on a preset protocol, and may obtain seat numbers that distinguish the seats where the wearable terminals 200 are located, respectively, in the operation of forming the communication channel.

In a second operation S320, the hub 100 may obtain a voice signal from a conversation attempt terminal attempting to transmit a voice among the wearable terminals 200.

The hub 100 may determine a conversation support mode for relaying a conversation after confirming a conversation willingness to attempt a conversation with another wearable terminal 200 based on a voice signal from the conversation attempt terminal in the vehicle. The conversation willingness may be a preset wakeup work word. Alternatively, the hub 100 may determine whether the user's intention to have a conversation is included in the voice signal based on artificial intelligence learning.

In a third operation S330, the hub 100 may select at least one target terminal from the wearable terminals 200 based on the voice signal. The command for calling the target terminal may be preset or determined based on artificial intelligence leaning of the hub 100. There may be more than one target terminal.

In a fourth operation S340, the hub 100 relays the bidirectional voice information transfer between the conversation attempt terminal and the target terminal. Therefore, even if the hub 100 establishes a communication channel with all the wearable terminals 200 in the first operation S310, the voice information transfer is stopped except for the conversation attempt terminal and the target terminal.

Figure 4:
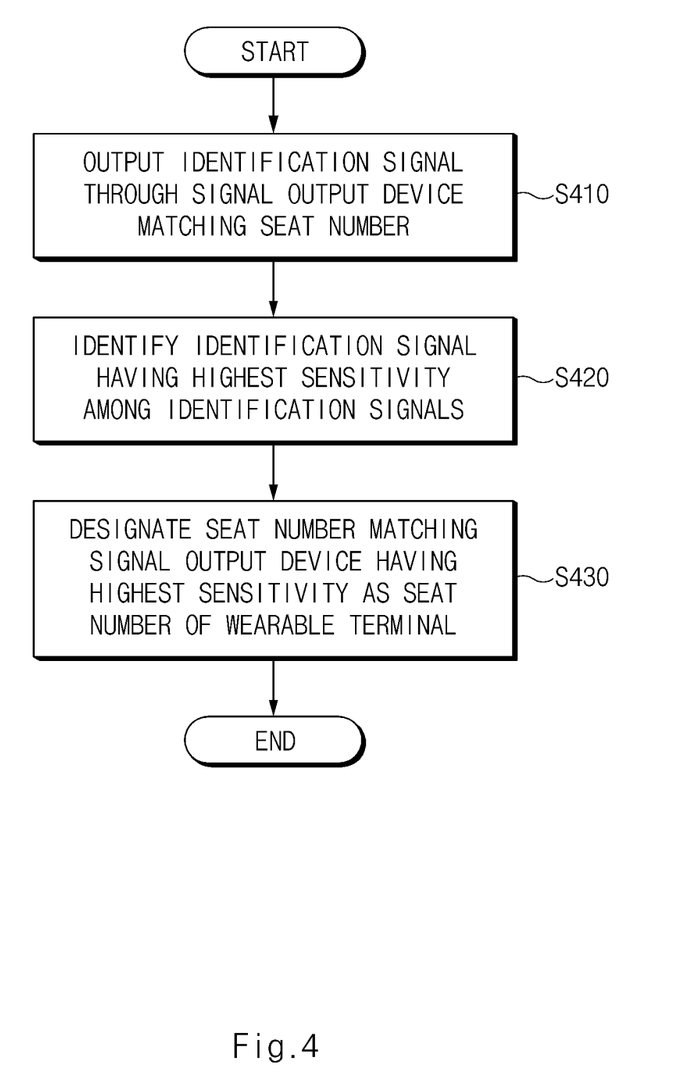
FIG. 4 is a flowchart showing a method of obtaining a seat number by a wearable terminal.
Figure 5:
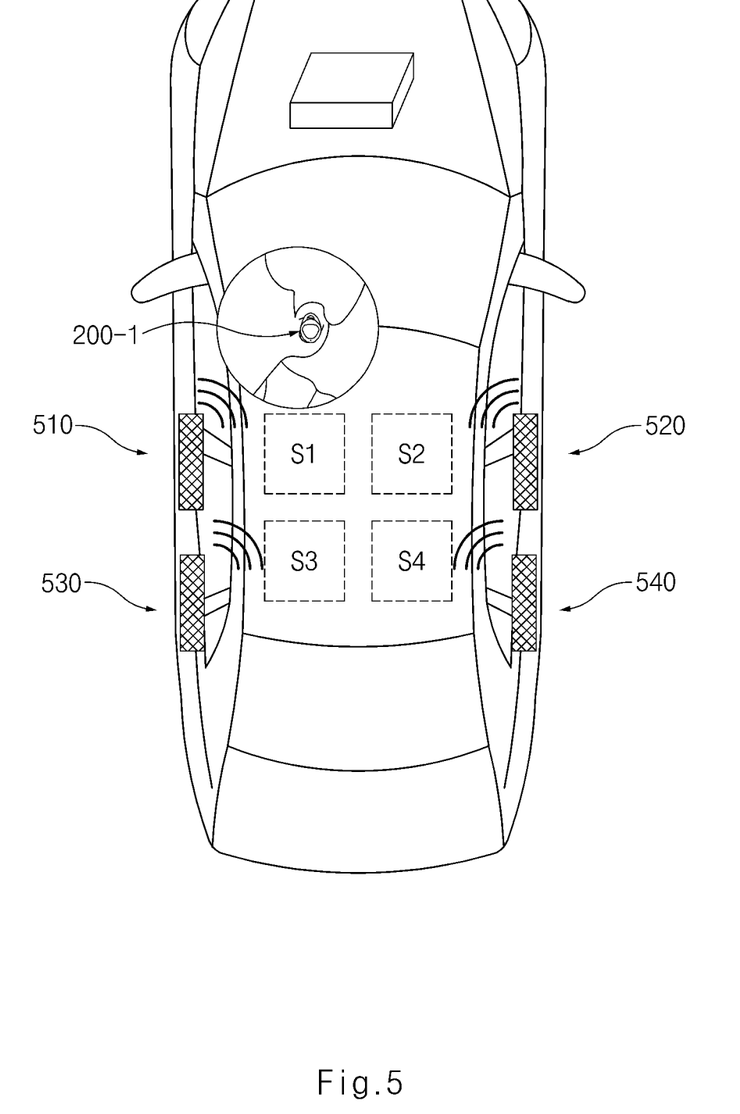
FIG. 5 is a diagram illustrating a method of obtaining a seat number by a wearable terminal.

FIG. 4 is a flowchart showing a method of obtaining a seat number by a wearable terminal. FIG. 5 is a view illustrating the procedure of FIG. 4.

With reference to FIGS. 4 and 5, a method of obtaining a seat number by a first wearable terminal 200-1 among the wearable terminals 200 will be described as follows.

In a first step S410, signal output devices 510, 520, 530, and 540 output different identification signals under control of the hub 100, respectively. Each of the signal output devices 510, 520, 530, and 540 is matched one-to-one with a seat in the vehicle. The signal output devices 510, 520, 530, and 540 may be matched with the closest seats. For example, the first signal output device 510 may match the left seat of the front row. Unique seat numbers for identifying seat locations are assigned to the seats, respectively. Therefore, each of the signal output devices 510, 520, 530, and 540 may be matched with one seat number, and as shown in FIG. 1, the seat numbers matching the signal output devices 510, 520, 530, and 540 may be stored in advance in the database of the hub 100.

Each of the signal output devices (510, 520, 530, 540) may use a directional speaker that transmits sound to the matched seat. For example, the first signal output device 510 may correspond to the first speaker 510 that outputs sound toward a front left seat s1 among the four seats in the vehicle. The identification signals may be different from each other in any one or more of frequency, amplitude, period, and output timing.

In a second step S420, the hub 100 may receive information about the highest sensitivity identification signal from the first wearable terminal 200-1.

The highest sensitivity identification signal refers to an identification signal received with the highest sensitivity among identification signals received by the first wearable terminal 200-1. Even though only the first signal output device 510 has a transmission direction toward the first wearable terminal 200-1, the first wearable terminal 200-1 may receive signals transmitted from the second to fourth signal output device 520, 520, and 540. The first wearable terminal 200-1 may grasp the reception sensitivity of each signal received from the first to fourth signal output devices 510 to 540, and may extract the highest sensitivity identification signal representing the highest reception sensitivity among the reception sensitivities. In addition, the first wearable terminal 200-1 may provide information on the highest sensitivity identification signal to the hub 100.

In a third step S430, the hub 100 may obtain the seat number of the first wearable terminal 200-1 based on the highest sensitivity identification signal. The hub 100 may identify the signal output device outputting the highest sensitivity identification signal, and may designate the seat number matching the corresponding signal output device as the seat number of the first wearable terminal 200-1.

Figure 6:
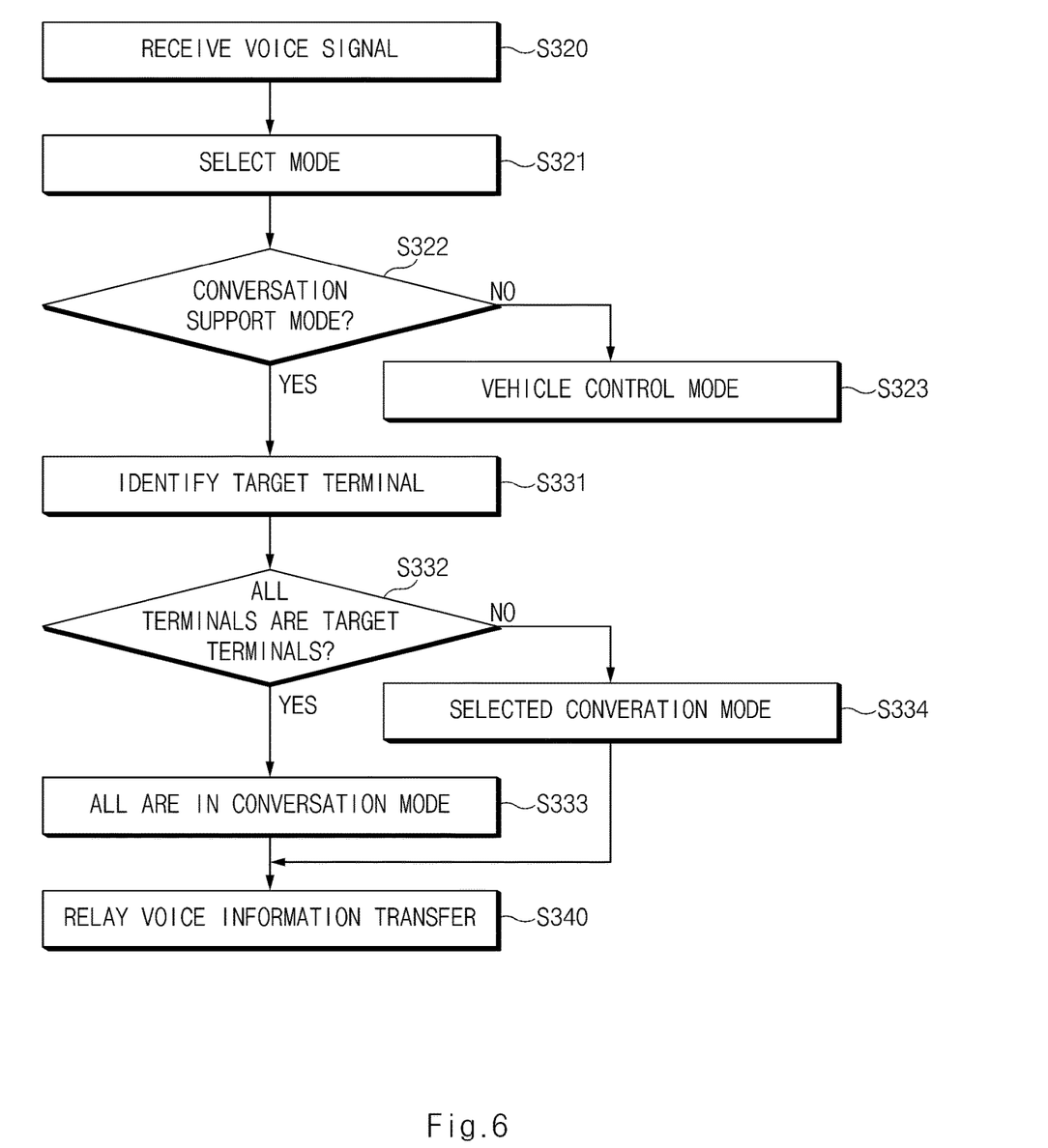
FIG. 6 is a flowchart illustrating a method of selecting an operation mode according to an embodiment of the present disclosure.

FIG. 6 is a flowchart illustrating a method of selecting an operation mode according to an embodiment of the present disclosure.

Referring to FIG. 6, in S320, the hub 100 may receive a voice signal in order to select an operation mode according to an embodiment of the present disclosure.

In S321, the hub 100 may select a mode based on the voice signal. The hub 100 may determine whether a wakeup work word is included in the voice signal, or may identify the speaker's intention to have a conversation by learning the voice signal with artificial intelligence. That is, the hub 100 may select a mode based on a conversation intention.

In S322, the hub 100 may operate in a conversation support mode based on the confirmation of the conversation intention. In S323, when the intention to have a conversation is not confirmed in the voice signal, the hub 100 may operate in a voice recognition-based vehicle control mode.

In S331, the hub 100 may identify the number of target terminals during operating in a conversation support mode.

In S332 and S333, the hub 100 may operate in a full conversation mode on the basis that all wearable terminals 200 in the vehicle are target terminals.

In addition, when even one is not a target terminal, the hub 100 may operate in a selective conversation mode in S334.

The hub 100 may perform the voice information transfer according to the full conversation mode or the selective conversation mode. Based on the full conversation mode, the hub 100 may connect a communication channel between all wearable terminals 200.

Based on the selective conversation mode, the hub 100 may connect a communication channel between the conversation attempt terminal and the target terminals. Therefore, while operating in the selective conversation mode, there may be a reception restrict terminal whose communication channel is restricted.

Figure 7:
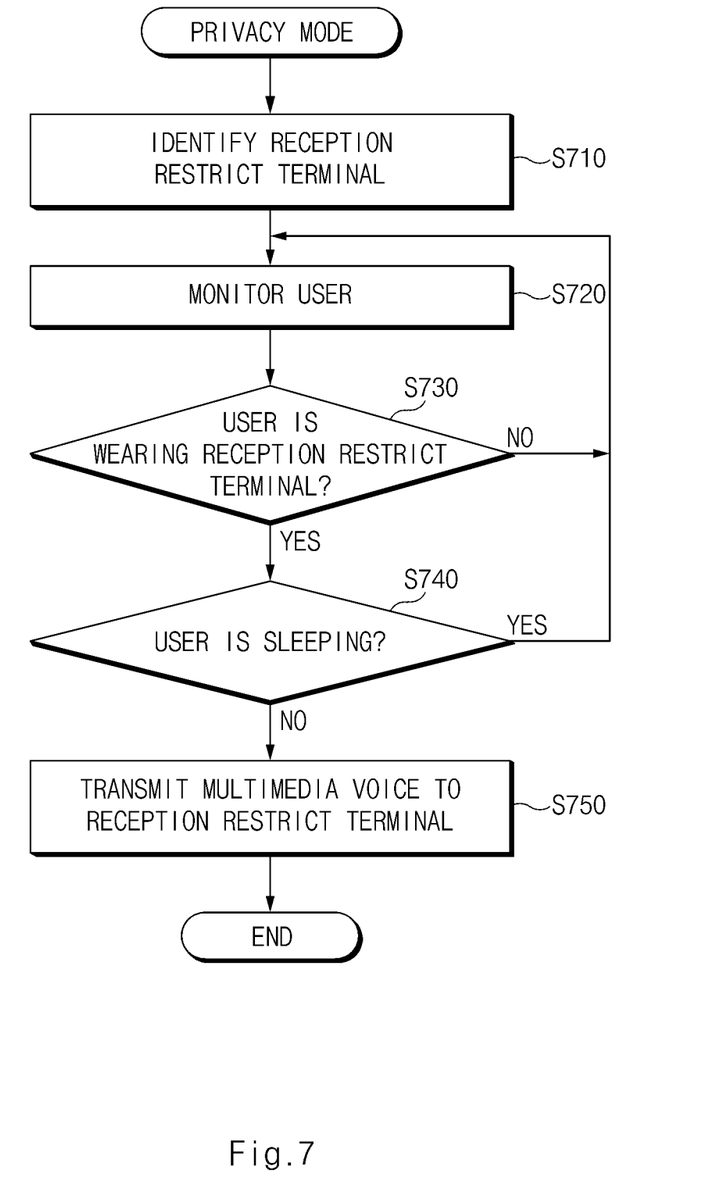
FIG. 7 is a flowchart illustrating an operation in a privacy mode.

The hub 100 may operate in the following privacy mode in order to restrict the user of the reception restrict terminal to listen to the conversation.

FIG. 7 is a flowchart illustrating an operation in a privacy mode.

Referring to FIG. 7, when the privacy mode operation is set, the hub 100 may identify the reception restrict terminal in a first operation S710. The hub 100 may select a terminal that does not belong to a target terminal among all the wearable terminals 200 in the vehicle as a reception restrict terminal.

In a second operation S720, the hub 100 may identify the user of the reception restrict terminal, and monitor the user.

In a third operation S730, to monitor the user, the hub 100 may determine whether the user is wearing the reception restrict terminal. To this end, the hub 100 may receive sensing information from the proximity sensor 240. The hub 100 may determine a separation distance between the reception restrict terminal and the user based on the sensing information of the proximity sensor 240, and determine whether the user is wearing the reception restrict terminal based on the separation distance.

In a fourth operation S740, the hub 100 may determine whether the user is in a sleeping state based on the confirmation of the state in which the user wears the reception restrict terminal. The hub 100 may receive biometric information such as a heart rate from the sensing terminal 400 of the user and determine whether the user is in a sleeping state based on the biometric information.

In a fifth operation S750, the hub 100 may transmit a multimedia voice to the reception restrict terminal based on the confirmation that the user is in anon-sleep state. The multimedia voice may be preset music, drama, or movie, and may be a voice transmitted by a broadcasting medium in real time.

Based on the privacy mode, the hub 100 may prevent the user of the reception restrict terminal from attempting to listen to the conversation by transmitting a multimedia voice.

In addition, in the third operation S730, the hub 100 may transmit a multimedia voice through a speaker in the vehicle closest to the reception restrict terminal when the user does not wear the reception restrict terminal. Accordingly, the hub 100 may interfere with an attempt to listen to a conversation even to a user of the reception restrict terminal who does not wear the wearable terminal 200.

Figure 8:
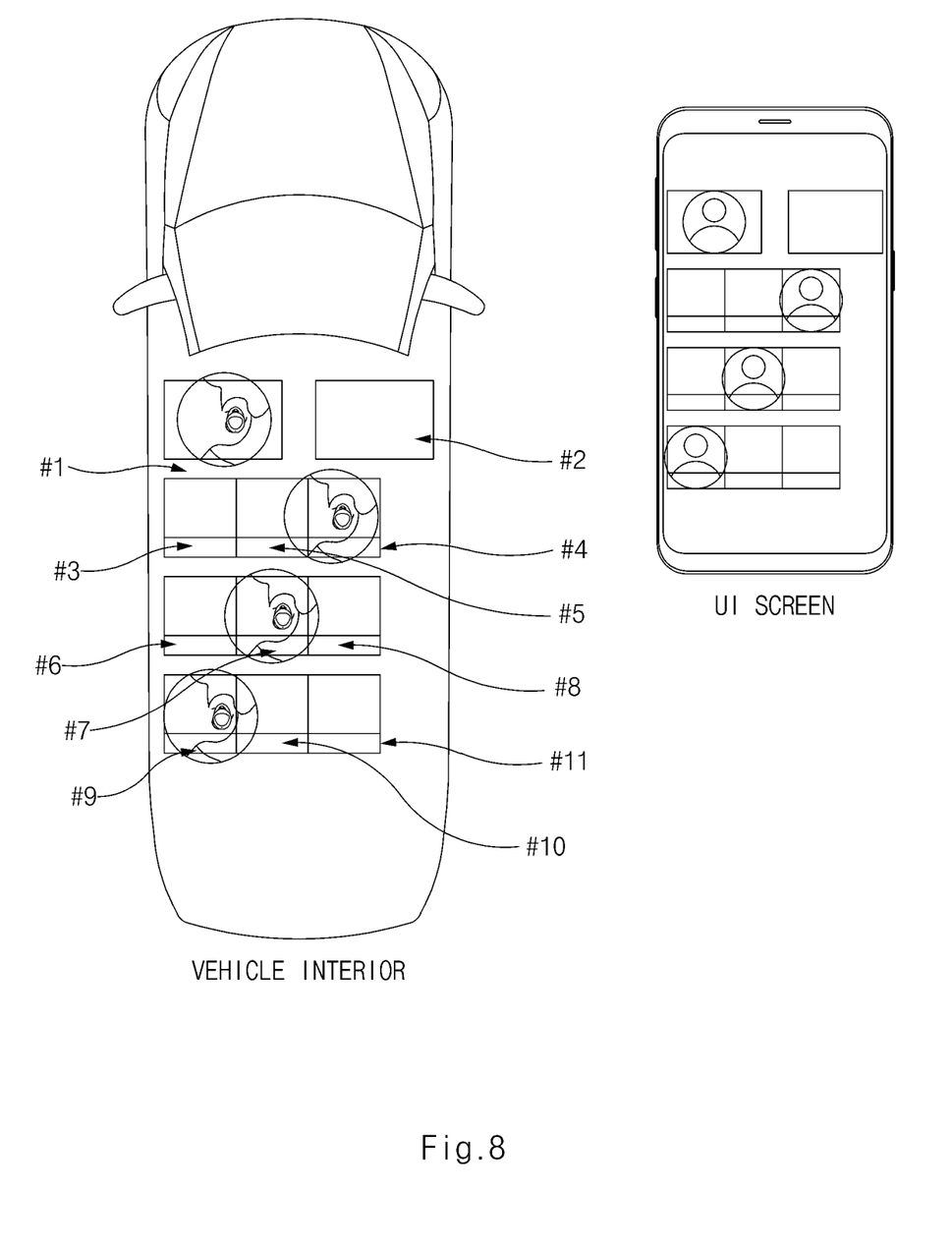
FIG. 8 is a schematic diagram illustrating an example of selecting a target terminal according to an embodiment of the present disclosure.

FIG. 8 is a schematic diagram illustrating an example of selecting a target terminal according to an embodiment of the present disclosure. FIG. 8 shows the interior of a vehicle with 11 seats. The seats are distinguished by first to eleventh seat numbers #1 to #11.

Referring to FIG. 8, the controller 110 of the hub 100 may control the portable terminal 300 to display information on the seats in which users are seated on the portable terminal 300.

The hub 100 may obtain the seat number of each wearable terminal 200, and may display seat information matching the obtained seat number on a user interface (UI) of the portable terminal 300. The UI may be implemented using a touch panel that receives a user input while displaying an image.

In response to a touch input of a point corresponding to arbitrary seat information in the UI where seat information is displayed, the portable terminal 300 may provide the seat information of the touch point to the hub 100. The hub 100 may select a target terminal based on the seat information provided from the portable terminal 300.

Figure 9:
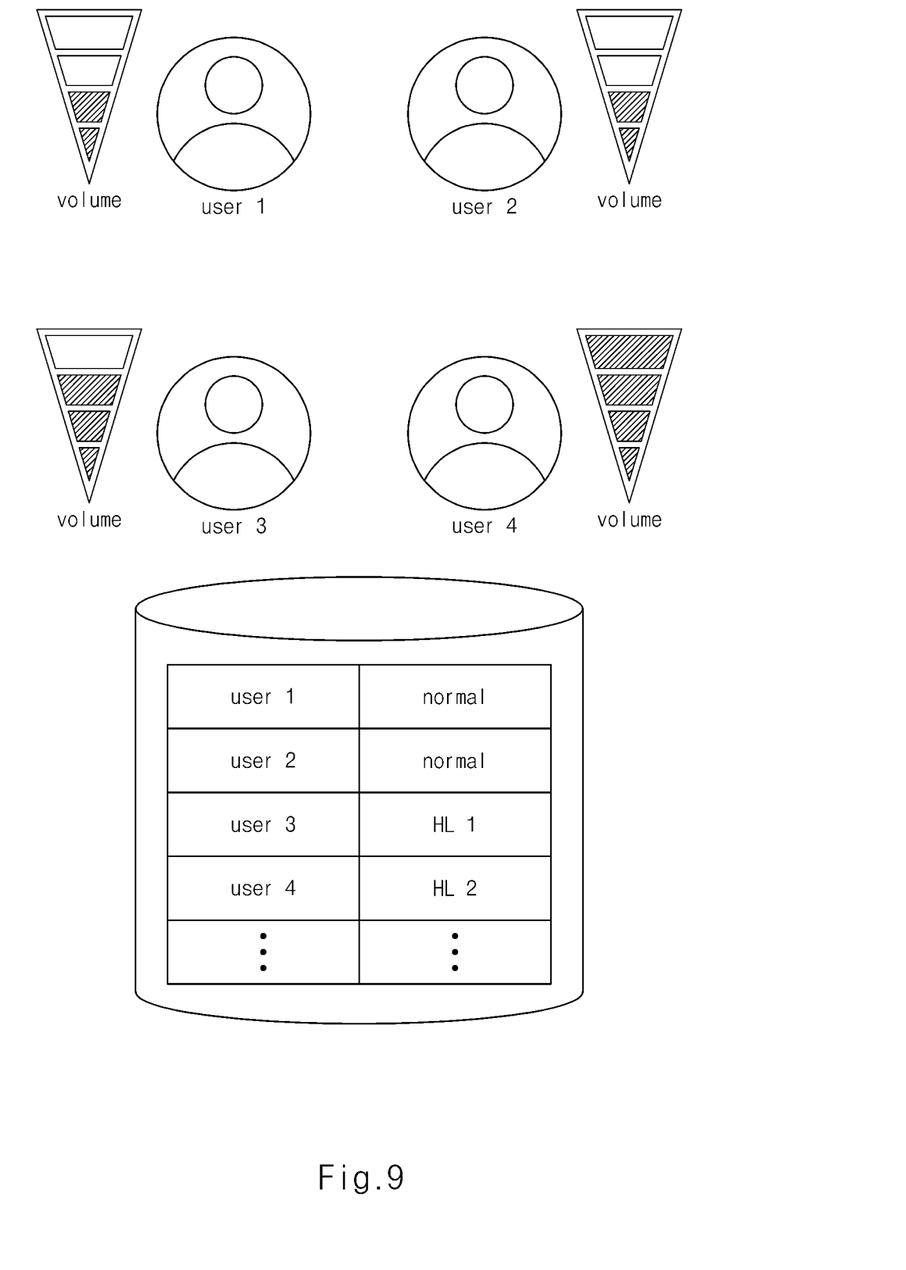
FIG. 9 is a diagram illustrating an example of adjusting the volume of a voice in a conversation support mode according to an embodiment of the present disclosure.

FIG. 9 is a diagram illustrating an example of adjusting the volume of a voice in a conversation support mode according to an embodiment of the present disclosure.

Referring to FIG. 9, the hub 100 may obtain hearing information of users in the process of forming a communication channel with the wearable terminals 200. To this end, the database DB of the hub 100 may be in a state in which the unique identification information of the wearable terminal 200, the user information and the hearing information of the users are stored while being matched with each other. For example, FIG. 9 illustrates that the hearing abilities of the first user (user1) and the second user (user2) are "normal", the hearing ability of the third user is "bradyecoia stage 1", and the hearing ability of the fourth user is "bradyecoia stage 2".

The hub 100 may adjust the volume of the voice transmitted through the wearable terminals 200 based on the hearing information. For example, the controller 110 of the hub 100 may control the transmission processing device 130 to increase the volume of the voice transmitted to the third and fourth users (user3 and user4) rather than the volume of the voice transmitted to the first and second users (user1 and user2).

Figure 10:
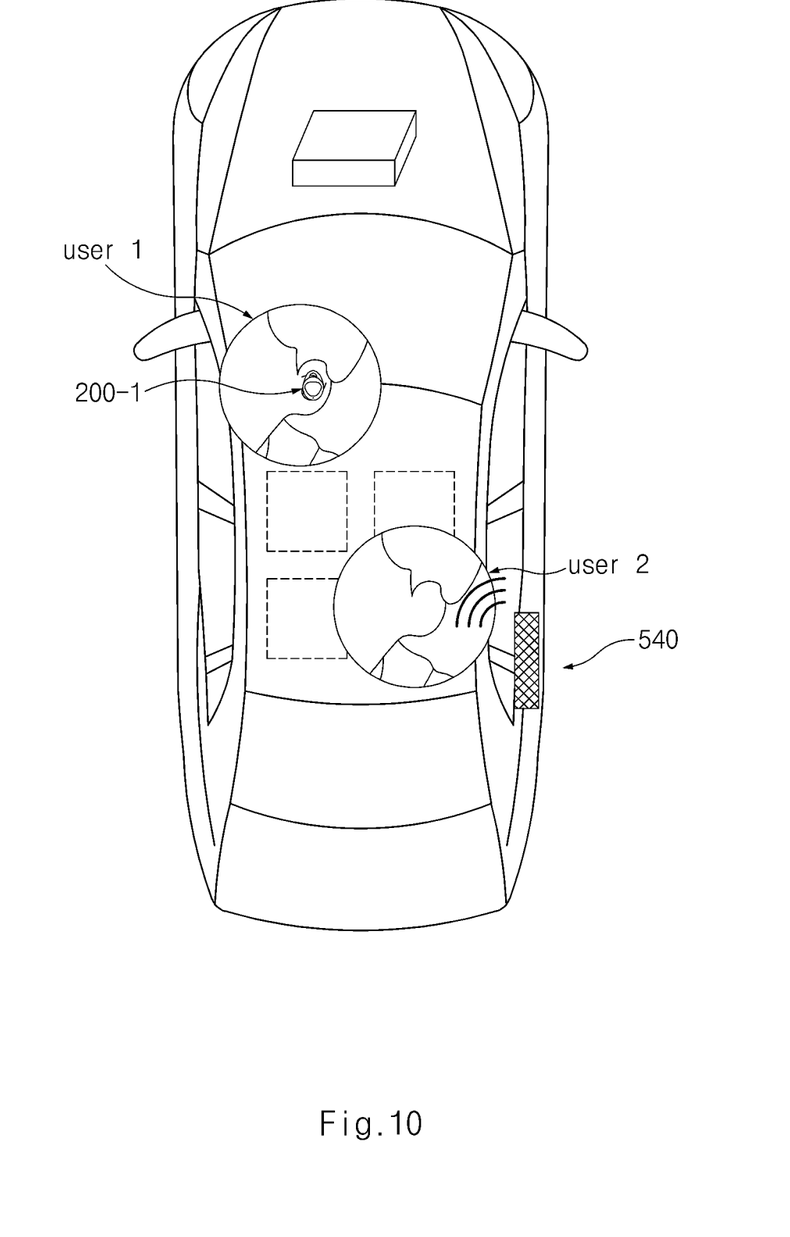
FIG. 10 is a diagram illustrating an example of a method for assisting voice relay.

FIG. 10 is a diagram illustrating an example of a method for assisting voice relay.

Referring to FIG. 10, the hub 100 may determine whether the conversation attempt terminal and the target terminals are worn by users. When the wearable terminal 200, which is a conversation relay target, is not worn by the user like a second user, the hub 100 may output a voice through the fourth speaker 540 closest to the user who is not wearing a terminal. In this case, the hub 100 may control the fourth speaker 540 to transmit a guide message to the second user (user2) to wear the wearable terminal 200.

Figure 11:
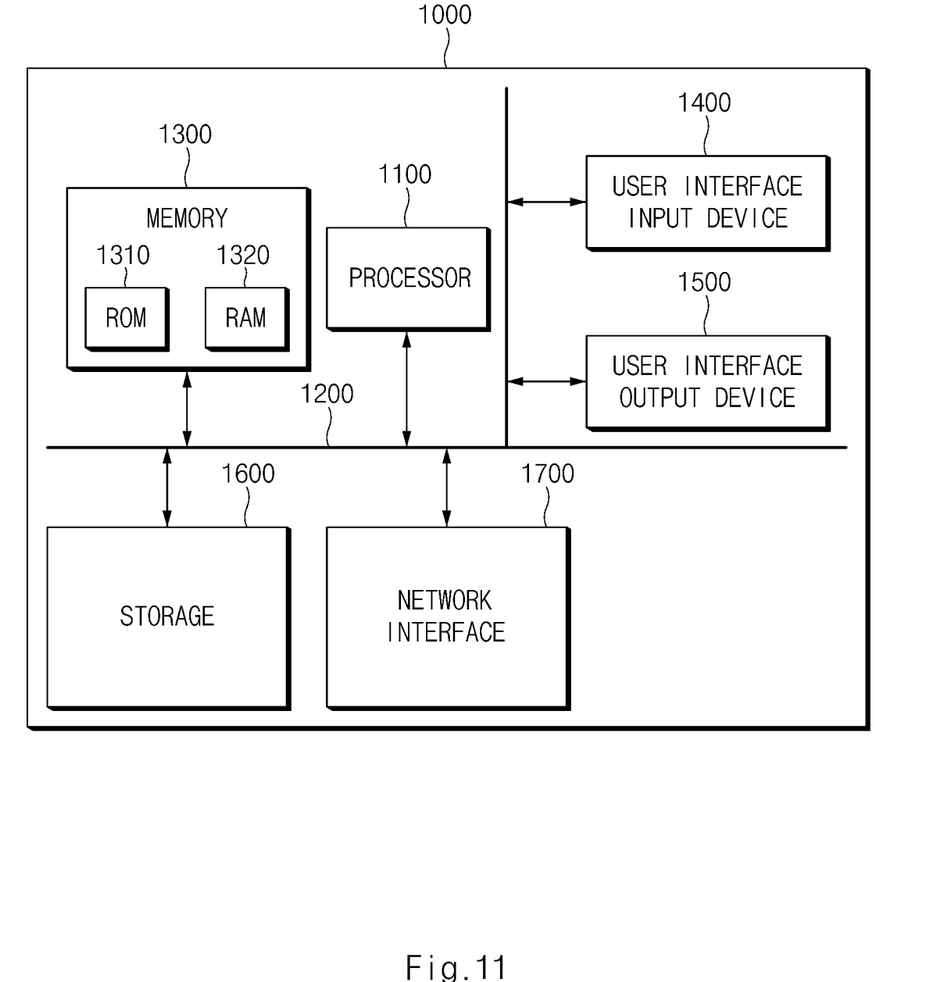
FIG. 11 is a block diagram illustrating a computing system according to an embodiment of the present disclosure.

FIG. 11 is a block diagram illustrating a computing system according to an embodiment of the present disclosure.

Referring to FIG. 11, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600, and may include the hub 100 according to an embodiment of the present disclosure. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, because the in-vehicle voice relay is supported by utilizing a personal terminal of an occupant, it is possible to relay a conversation between occupants in a vehicle while minimizing additional hardware configuration.

In addition, according to the embodiments of the present disclosure, by transmitting a multimedia voice to occupants who are not selected for a conversation, it is possible to relay the conversation between the occupants in the vehicle while preventing unwanted persons from listening to the conversation.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A hub for supporting a voice relay between wearable terminals in a vehicle, the hub comprising:
    a reception processing device configured to receive a voice signal from at least one transmission terminal among two or more wearable terminals in the vehicle;
    a transmission processing device configured to transmit the voice signal to at least one reception terminal among the wearable terminals; and
    a controller configured to establish a communication channel with each of the wearable terminals, select a target terminal based on a voice signal obtained from a conversation attempt terminal attempting to transmit voice, and control the reception processing device and the transmission processing device to relay voice information transfer between the conversation attempt terminal and the target terminal,
    wherein the controller is configured to match one-to-one between wearable terminals and a seat number that distinguishes a seat of the vehicle, and select the target terminal by extracting the seat number from the voice signal.

2. The hub of claim 1, wherein the controller is configured to:
    control signal output devices such that signal output devices matching seat numbers on a one-to-one basis output different identification signals;
    receive information on a highest sensitivity identification signal received at a highest sensitivity among a plurality of identification signals from a first wearable terminal among the wearable terminals; and
    match the first wearable terminal with the seat number that matches a highest sensitivity signal output device configured to output the highest sensitivity identification signal among the signal output devices.

3. The hub of claim 2, wherein the controller is configured to use directional speakers respectively arranged in the seats as the signal output device.

4. The hub of claim 2, wherein the controller is configured to set at least one of a frequency, a period, an amplitude, or an output timing of each of the identification signals differently.

5. The hub of claim 1, wherein the controller is configured to provide information on seat numbers where users of the wearable terminals are seated to portable terminals of the users.

6. The hub of claim 1, wherein the controller is configured to control the transmission processing device to transmit a multimedia voice to a reception restrict terminal matching a seat number not included in the voice signal.

7. The hub of claim 6, wherein the controller is configured to control the transmission processing device to stop transmitting the multimedia voice based on an access restrict user not wearing the reception restrict terminal.

8. The hub of claim 6, wherein the controller is configured to transmit the multimedia voice through a speaker closest to an access restrict user among speakers in the vehicle, based on the access restrict user not wearing the reception restrict terminal.

9. The hub of claim 6, wherein the controller is configured to control the transmission processing device to stop transmitting the multimedia voice based on a sleeping state of a user wearing the reception restrict terminal.

10. The hub of claim 1, wherein the controller is configured to:
    identify hearing ability information of users of the wearable terminals by searching for information stored in advance; and
    adjust a volume of a voice signal transmitted through the wearable terminals based on the hearing ability.

11. The hub of claim 1, wherein the controller is configured to output the voice signal through a speaker inside the vehicle closest to the target terminal based on confirmation of a state in which a user does not wear the target terminal.

12. A method of supporting a voice relay between at least two wearable terminals in a vehicle by using a hub, the method comprising:
    forming a communication channel with each of the wearable terminals;
    obtaining a voice signal from a conversation attempt terminal attempting to transmit voice among the wearable terminals;
    selecting at least one target terminal from the wearable terminals based on the voice signal; and
    relaying voice information transfer between the conversation attempt terminal and the target terminal,
    wherein selecting at least one target terminal includes:
    matching one-to-one between wearable terminals and a seat number that distinguishes a seat of the vehicle, and
    selecting the target terminal by extracting the seat number from the voice signal.

13. The method of claim 12, wherein obtaining the seat numbers includes:
    controlling signal output devices to allow the signal output devices matching the seat numbers on a one-to-one basis to output identification signals having different frequencies;
    receiving information on a highest sensitivity identification signal received at a highest sensitivity among the identification signals from a first wearable terminal among the wearable terminals;

identifying a location of a highest sensitivity signal output device that outputs the highest sensitivity identification signal among the signal output devices; and designating a seat number matching the highest sensitivity signal output device among the seat numbers as a seat number of the first wearable terminal.

14. The method of claim 12, wherein selecting the target terminal includes:

extracting a mode selection command from the voice signal; and extracting a seat number of the target terminal from the voice signal based on the extracted mode selection command being a dialogue support mode for voice relay.

15. The method of claim 12, wherein selecting the target terminal further includes:

identifying a reception restrict terminal that is not selected from the wearable terminals as the target terminal; and transmitting, by the hub, a multimedia voice to the reception restrict terminal based on identification of the reception restrict terminal.

16. The method of claim 15, wherein identifying the reception restrict terminal further includes:

determining whether a user wears the reception restrict terminal; and suspending the multimedia voice from being transmitted based on the user not wearing the reception restrict terminal.

17. The method of claim 15, wherein identifying the reception restrict terminal further includes:

determining whether a user wearing the reception restrict terminal is in a sleeping state; and suspending the multimedia voice from being transmitted based on the user being in the sleeping state.

18. The method of claim 12, wherein forming the communication channel further includes:

checking hearing information of users of the wearable terminals by searching for information stored in advance, and wherein relaying the voice information transfer includes:

adjusting a volume of a voice transmitted to the users through the wearable terminals based on the hearing information.

* * * * *